US011663686B1

(12) United States Patent
Durairaj et al.

(10) Patent No.: US 11,663,686 B1
(45) Date of Patent: May 30, 2023

(54) VERIFIED DRIVER SYSTEM FOR A MOTOR VEHICLE

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, Rockport, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 148 days.

(21) Appl. No.: 17/102,791

(22) Filed: Nov. 24, 2020

Related U.S. Application Data

(60) Provisional application No. 62/940,943, filed on Nov. 27, 2019.

(51) Int. Cl.
| | |
|---|---|
| *G06Q 50/10* | (2012.01) |
| *G06Q 50/26* | (2012.01) |
| *G07C 9/25* | (2020.01) |
| *G06K 7/14* | (2006.01) |
| *G06K 7/10* | (2006.01) |
| *G06Q 40/08* | (2012.01) |

(Continued)

(52) U.S. Cl.
CPC ............ *G06Q 50/265* (2013.01); *B60R 25/01* (2013.01); *B60R 25/25* (2013.01); *G06K 7/10415* (2013.01); *G06K 7/1413* (2013.01); *G06K 7/1417* (2013.01); *G06Q 30/0645* (2013.01); *G06Q 40/08* (2013.01); *G06Q 50/30* (2013.01); *G07C 5/008* (2013.01); *G07C 9/257* (2020.01); *H04W 4/48* (2018.02); *G06K 2007/10504* (2013.01); *G06Q 2240/00* (2013.01)

(58) Field of Classification Search
CPC .. G06Q 50/265; G06Q 30/0645; G06Q 40/08; G06Q 50/30; G06Q 2240/00; B60R 25/01; B60R 25/25; G06K 7/10415; G06K 7/1413; G06K 7/1417; G07C 5/008; G07C 9/257; H04W 4/48
USPC .......................................................... 235/384
See application file for complete search history.

(56) References Cited

U.S. PATENT DOCUMENTS

| | | | | |
|---|---|---|---|---|
| 2003/0204290 | A1* | 10/2003 | Sadler | G06V 40/10 701/1 |
| 2007/0239992 | A1* | 10/2007 | White | B60K 28/063 713/186 |

\* cited by examiner

*Primary Examiner* — Jamara A Franklin
(74) *Attorney, Agent, or Firm* — Plumsea Law Group, LLC

(57) ABSTRACT

A system and method for verifying a driver seated in a driver's seat of a vehicle is disclosed. The method includes scanning a license of the driver seated in the driver's seat of the vehicle to obtain a driver profile and detecting biometric information of the driver using one or more sensors in the vehicle. The driver profile includes biometric information. The method compares the detected biometric information with the biometric information of the driver profile to verify that the license of the driver seated in the vehicle matches the driver seated in the vehicle. The method may notify a provider computer system as to whether the license of the driver matches the driver seated in the vehicle. The method may adjust vehicle components based on preferences of the driver profile.

19 Claims, 7 Drawing Sheets

(51) Int. Cl.
*G06Q 50/30* (2012.01)
*G06Q 30/0645* (2023.01)
*B60R 25/25* (2013.01)
*B60R 25/01* (2013.01)
*H04W 4/48* (2018.01)
*G07C 5/00* (2006.01)

VERIFIED DRIVER SYSTEM FOR A MOTOR VEHICLE

CROSS-REFERENCE TO RELATED APPLICATIONS

This application claims the benefit of Provisional Patent Application No. 62/940,943 filed Nov. 27, 2019, and titled "Verified Driver System for a Motor Vehicle," which is incorporated by reference herein in its entirety.

TECHNICAL FIELD

The present disclosure generally relates to methods and systems for verification, and in particular to methods of verification for motor vehicles.

BACKGROUND

Drivers of vehicles are required to have a license to operate vehicles and to have insurance to drive the vehicles. A driver may obtain insurance for his or her own vehicle by paying a premium. For payment of another premium, the insurance provider may also offer additional insurance to cover renting or sharing a vehicle by the driver. There are also drivers who do not own a vehicle. The drivers who do not own a vehicle may pay a different premium to cover renting or sharing a vehicle by the driver. Additionally, vehicle sharing service providers and rental vehicle service providers may also offer insurance in exchange for payment of a premium.

The driving routine of a driver may impact an insurance premium charged by an insurance provider. Based on the routine of the driver, the insurance provider may wish to increase or decrease the insurance premium. However, rental vehicle service providers, vehicle sharing service providers, and insurance providers do not have a way to confirm who is actually in a driver's seat of a vehicle and driving the vehicle to verify the routine of the driver.

In addition, drivers are customers of vehicle sharing service providers and rental vehicle service providers. Vehicle sharing service provides and rental vehicle service providers wish to continuously accommodate customers by improving safety, comfort, and convenience. However, each driver has a different driver profile including different driver preferences while driving a vehicle. Rental vehicle service providers and vehicle sharing service providers have many different drivers having different driver profiles seated in a driver's seat to drive the vehicle. However, the rental vehicle service providers and vehicle sharing service providers are unable to automatically adjust vehicle components for the driver in the driver's seat for safety, comfort, and convenience of each driver.

There is a need in the art for a system and method that addresses the shortcomings discussed above.

SUMMARY

In one aspect, there is provided a method for verifying a driver seated in a driver's seat of a vehicle, including scanning a license of the driver seated in the driver's seat of the vehicle to obtain a driver profile including stored biometric information, wherein the license indicates an individual; detecting biometric information of the driver using one or more sensors in the vehicle; comparing the detected biometric information with the stored biometric information to verify that the driver seated in the vehicle corresponds to the individual indicated in the license using a computer system of the vehicle; and sending a first message to a provider computer system to notify the provider computer system that the driver has been verified when the driver seated in the vehicle corresponds to the individual indicated in the license.

In another aspect, there is provided a method for verifying a driver seated in a driver's seat of a vehicle, including scanning a license of the driver seated in the driver's seat of the vehicle to obtain a driver profile including stored biometric information, wherein the license indicates an individual; detecting biometric information of the driver using one or more sensors in the vehicle; comparing the detected biometric information with the stored biometric information to verify that the driver seated in the vehicle corresponds to the individual indicated in the license using a computer system of the vehicle; and retrieving from a provider computer system one or more driver preferences of the driver and loading the driver preferences of the driver into the computer system of the vehicle when the comparison verifies that the driver seated in the vehicle corresponds to the individual in the license.

In another aspect, there is provided a method for verifying a driver seated in a driver's seat of a vehicle, including scanning a license of the driver seated in the driver's seat of the vehicle to obtain a driver profile including driver preferences and stored biometric information, wherein the license indicates an individual; detecting biometric information of the driver using one or more sensors in the vehicle; comparing the detected biometric information with the stored biometric information to verify that the driver seated in the vehicle corresponds to the individual indicated in the license using a computer system of the vehicle; and adjusting one or more vehicle components to implement driver preferences of the seated driver of the vehicle when the comparison verifies that the driver seated in the vehicle corresponds to the individual indicated in the license.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

As already discussed, insurance companies and/or ride sharing companies may need to confirm that a person driving a particular vehicle has a license. More specifically, there is a need to confirm that the driver is in fact the individual associated with the license carried by the driver. Therefore, one or more embodiments provide systems, devices, and methods for verifying that the driver seated in a driver's seat of a vehicle has a license and that they are the individual indicated in the license.

For example, one or more embodiments, may provide a system, which may include a scanner installed in a vehicle to scan a license of a driver seated in a driver's seat. This scanner may be referred to as a license scanner. Scanning the license may refer to reading or retrieving a profile of a driver stored on the license. For example, the license may include a chip, a bar code, a QR code, or any other mechanism, which can store a driver profile on a license of a driver. For example, the license may be placed on a scanner or inserted into a slot. Both the slot and scanner may be collectively referred to as a scanner (scanning device), which may read a driver profile from a license. In one or more embodiments, the scanner may also be configured to receive the driver profile from a digital driver's license. A digital driver's license may be provided by executing a digital driver's license application on a mobile computing device.

In one or more embodiments, the driver profile may include information to identify the driver. For example, the driver profile may include biometric information stored in the license of the driver. Biometric information of the driver seated in the driver's seat may be detected by sensors in the vehicle. The detected biometric information may be compared with the stored biometric information to verify that the identity of the actual driver. In one or more embodiments, the driver profile may also include one or more driver preferences such as seat position, mirror position, infotainment preferences, lighting preferences, and temperature preferences. These driver preferences may be adjusted for the safety, comfort, and convenience of the actual verified driver seated in the driver's seat.

Figure 1:
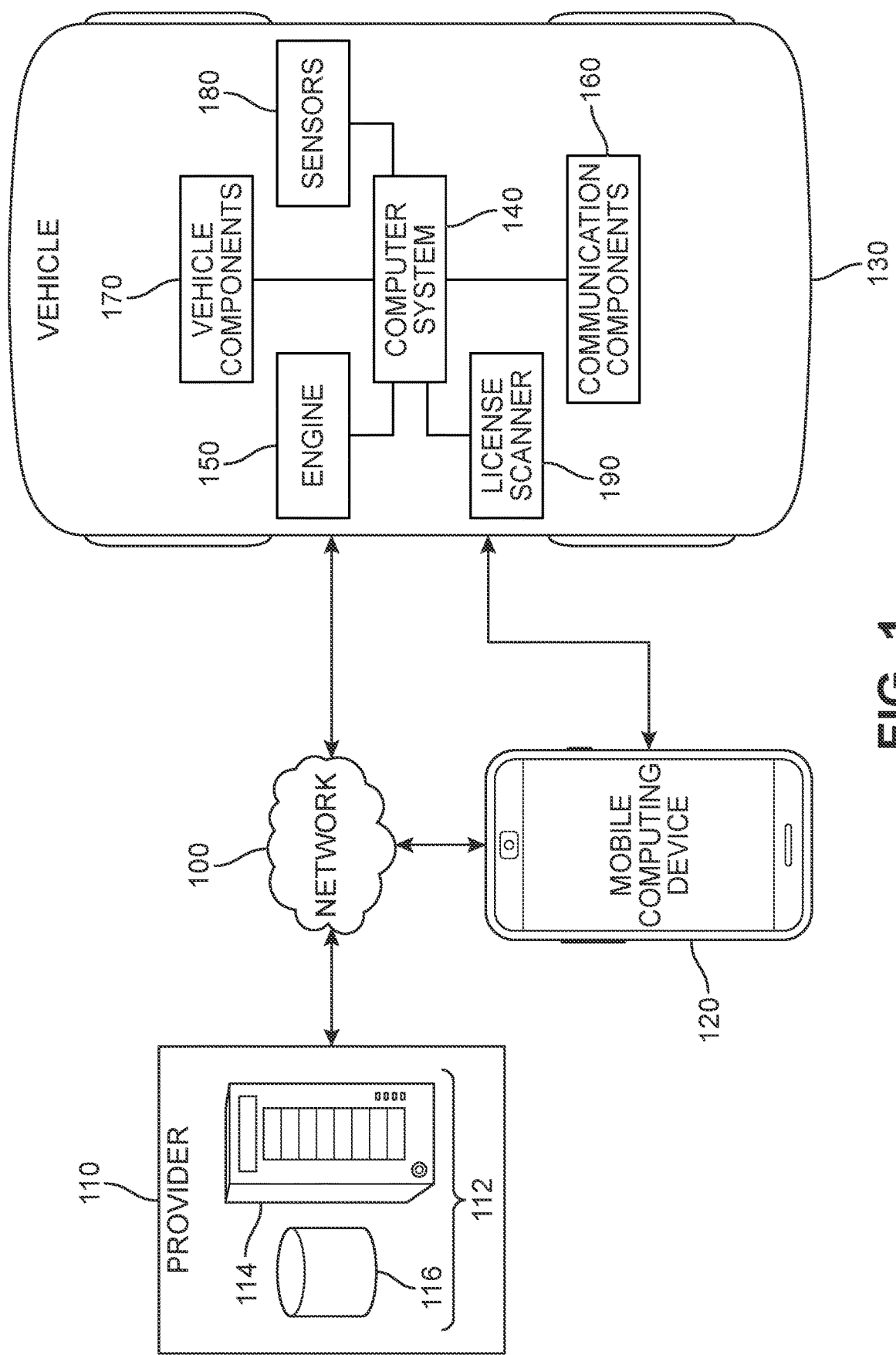
FIG. 1 is a schematic view of a system for verifying the actual driver seated in a driver's seat of a vehicle according to an embodiment.

FIG. 1 is a schematic view of a system for verifying the driver seated in a driver's seat of a vehicle according to an embodiment. This verification of the actual driver may be for any type of insurance provider, service provider, or any government agency. In one or more embodiments, the term "insurance provider" as used herein refers to any institutions or companies that provide insurance products including vehicle insurance for renting, sharing, and/or owning a vehicle. An insurance product may be characterized by an insurance policy, which is a contract between an insurance provider (the "insurer") and a policy holder (the "insured"). In cases where vehicle insurance is provided, the policy holder may be an owner and/or driver of a vehicle. The policy holder may also be referred to as a customer of the insurance provider.

In one or more embodiments, this verification of the driver may be for a vehicle sharing service provider. In one or more embodiments, the term "vehicle sharing service provider" as used herein refers to any institutions or companies that provide vehicle sharing service products. A vehicle sharing service provider may also offer insurance from an insurance provider to a driver. For example, in one or more embodiments, the vehicle sharing service provider may offer a government minimum liability insurance, comprehensive insurance, and collision insurance through an insurance provider.

In one or more embodiments, this verification of the driver may be for a rental vehicle service provider. In one or more embodiments, the term "rental vehicle service provider" as used herein refers to any institutions or companies that provide vehicle rental service products. A rental vehicle service provider may also offer a variety of insurance products through an insurance provider to a driver.

In one or more embodiments, a vehicle may be any machine that transports one or more persons and one or more articles. The vehicle may include an engine, which is any machine converting one form of energy into mechanical energy to cause movement of the vehicle. An internal combustion engine is only one example of an engine of a vehicle. An automobile is only one example of a vehicle.

As shown in FIG. 1, a network 100 may connect a provider 110 with at least one of a mobile computing device 120 and at least one vehicle 130. The mobile computing device 120 may also communicate with the vehicle 130. An example of the network 100 is the Internet. Examples of a provider 110 include an insurance provider, a vehicle sharing provider, and a vehicle sharing service provider. Although one provider is shown in FIG. 1 as an example, one or more providers 110 may communicate with network 100, so that both the mobile computing device 120 and vehicle 130 may communicate with one or more providers 110 through network 100. Each provider 110 may communicate wired or wirelessly with network 100 and the network 100 may wirelessly communicate with the mobile computing device 120 and vehicle 130.

In addition, the provider 110 may include a computing system 112. The term "computing system" refers to the computing resources of a single computer, the partial computing resources of a single computer, a plurality of computers communicating with one another, or a network of servers. The "computing system" may also be a "cloud computing system." In an exemplary embodiment, computing system 112 includes at least one server.

In the embodiment of FIG. 1, computing system 112 includes one or more computing devices 114 (for example, a server) that may be in communication with one or more databases 116. Computing device 114 may include one or more processors and a non-transitory computer readable medium. Instructions stored on the non-transitory computer readable medium may be executed by the one or more processors. Database 116 could be co-located with computing device 114 or could be remote databases that are accessible by computing device 114 over network 100. Database 116 can include any kind of storage devices, including but not limited magnetic, optical, and magneto-optical, storage devices, which may include volatile memory and non-volatile memory. The term database and memory may be interchangeable.

An example of a vehicle 130 includes a computer system 140 communicating with an engine 150, communication components 160, vehicle components 170, sensors 180, and a license scanner 190. In one or more exemplary embodiments shown in the Figures, the vehicle 130 is shown as an automobile. However, any type of vehicle having an engine 150 may be used. As discussed above, an engine 150 may be any machine converting one form of energy into mechanical energy to cause movement of the vehicle 130. The vehicle 130 also includes a computer system 140. The computer system 140 includes one or more processors in communication with a memory. The memory may be a non-transitory computer readable medium. Instructions stored on the non-transitory computer readable medium may be executed by the one or more processors. The computer system 140 may include or access a global positioning system (GPS), which indicates a location of the vehicle.

Figure 2:
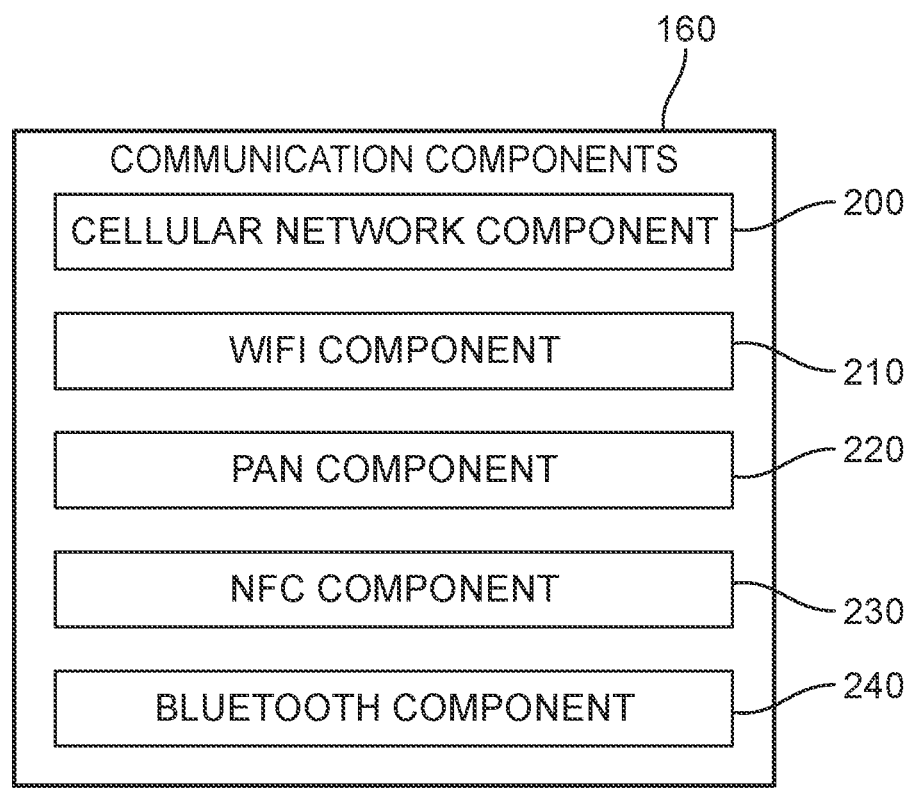
FIG. 2 is a schematic view of communication components according to an embodiment.

The computer system 140 also communicates with communication components 160. Referring to FIG. 2, examples of communication components 160 may include a cellular network component 200, a WIFI component 210, a personal area network (PAN) component 220, a near field communication (NFC) component 230, and a Bluetooth component 240. One or more of these communication components 160 may be used for communication with the network 100 and/or mobile computing device 120. Any type of wireless or wired communication technology may be used for communication between the vehicle 130 and the provider through the network 100 in FIG. 1. Moreover, any type of wireless or wired communication technology may be used for communication between the vehicle 130 and the mobile computing device 120 in FIG. 1.

Figure 3:
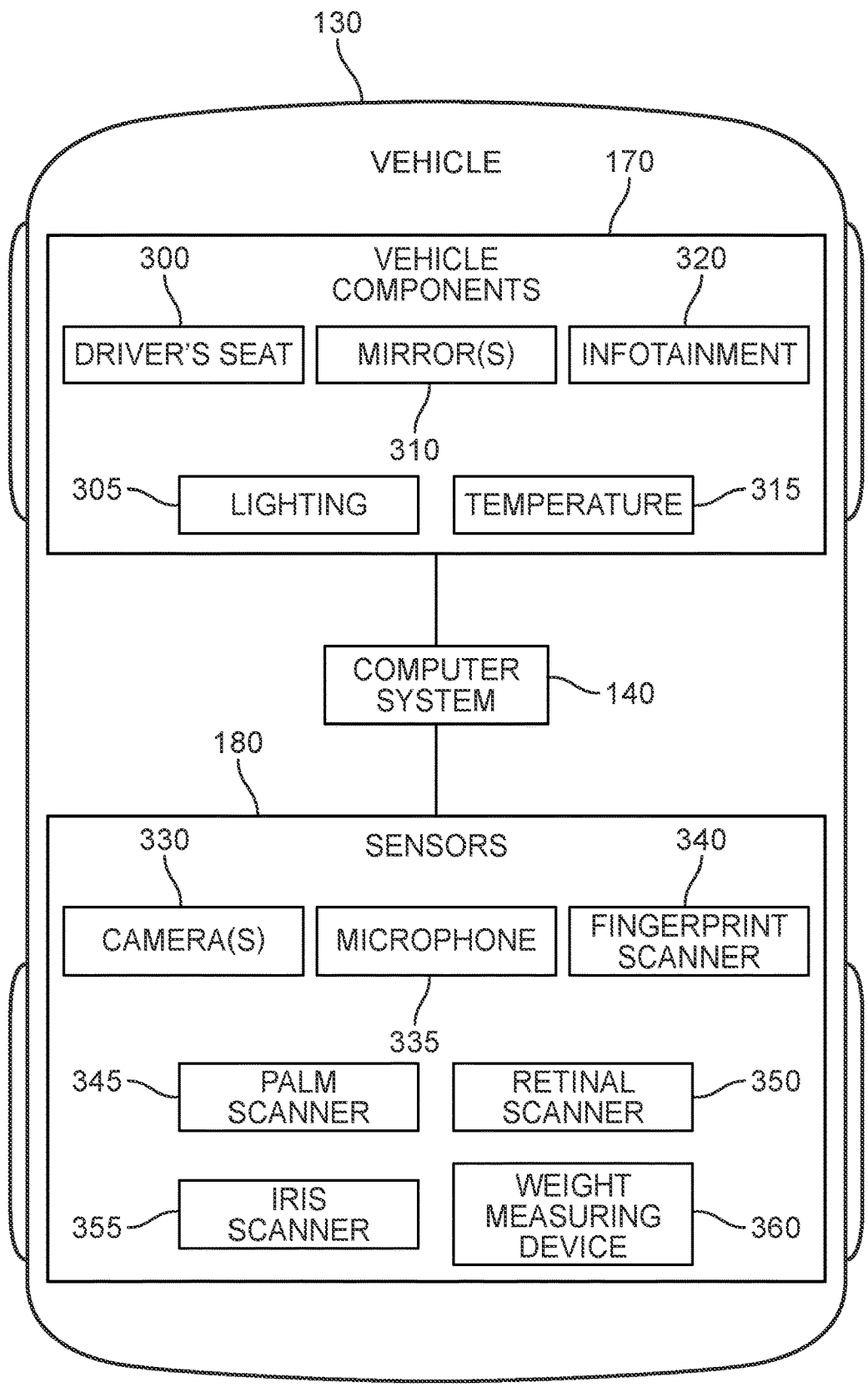
FIG. 3 is a schematic view of vehicle components and sensors according to an embodiment.

FIG. 3 is a schematic view of vehicle components and sensors according to an embodiment. FIG. 3 shows a computer system 140 of vehicle 130 communicating with vehicle components 170 and sensors 180. Vehicle components may include but are not limited to a driver's seat 300, lighting 305, mirror(s) 310, temperature 315, and infotainment 320. The computer system 140 may instruct vehicle components 170 to make adjustments in accordance with a driver profile after the driver has been verified. For example, the driver's seat 300 may be adjusted forward to accommodate a passenger having a shorter height. The lighting 305 in the vehicle 130 may become brighter or dimmer depending on the driver profile. For example, the driver profile may indicate that the lighting on the dashboard of vehicle 130 becomes brighter. One or more mirrors 310 such as the rearview mirror, driver's side mirror, and passenger side mirror may be adjusted based on driver preferences. The computing system 140 may instruct a temperature control system (temperature 315) to set the temperature in the vehicle 130. The infotainment system 320 may include a radio. After the driver has been verified, the infotainment system 320 may be adjusted to driver preferences to provide a certain type of music station such as classical or jazz music at a certain volume.

Referring to FIG. 3, the sensors 180 located in vehicle 130 and communicating with the computer system 140 provide detected biometric information regarding the driver in the driver's seat 300. The detected biometric information may be compared against a driver profile including stored biometric information, which is retrieved through a license scanner 190 in the vehicle 130 in FIG. 1. For example, a license scanner 190 may be any device that can read or retrieve a profile of a driver stored on the license. For example, the license may include a chip, a bar code, a QR code, or any other mechanism, which can store a driver profile on a license of a driver. For example, the license may be placed on a license scanner 190 or inserted into a slot of a license scanner 190. The license scanner 190 may be a device emitting a beam of light for scanning a driver's license. All of these devices may be referred to as a license scanner (license scanning device), which may read a driver profile from a license. In one or more embodiments, the scanner may also be configured to receive the driver profile from a digital driver's license. A digital driver's license may be provided by executing a digital driver's license application on a mobile computing device 120.

Referring to FIG. 3, the sensors 180 located in vehicle 130 can provide detected biometric information regarding the driver in the driver's seat 300. The sensors 180 may include one or more cameras 330 to capture an image of the driver for facial recognition. The sensors 180 may also include a microphone 335 to capture a voice of the driver for voice recognition. The sensors 180 may also include a fingerprint scanner 340 to capture a fingerprint of the driver for a fingerprint comparison. The sensors 180 may also include a palm scanner 345 to capture a palm of the driver for a palm comparison. The sensors 180 may also include a retinal scanner 350 to perform a retinal scan of the eye of the driver for a retinal scan comparison. The sensors 180 may also include an iris scanner 355 to perform an iris scan of the eye of the driver for an iris scan comparison. The sensors 180 may also include a weight measuring device 360 such as a pressure sensor installed in the driver's seat 300 to measure the weight of the driver for a weight comparison.

Figure 4:
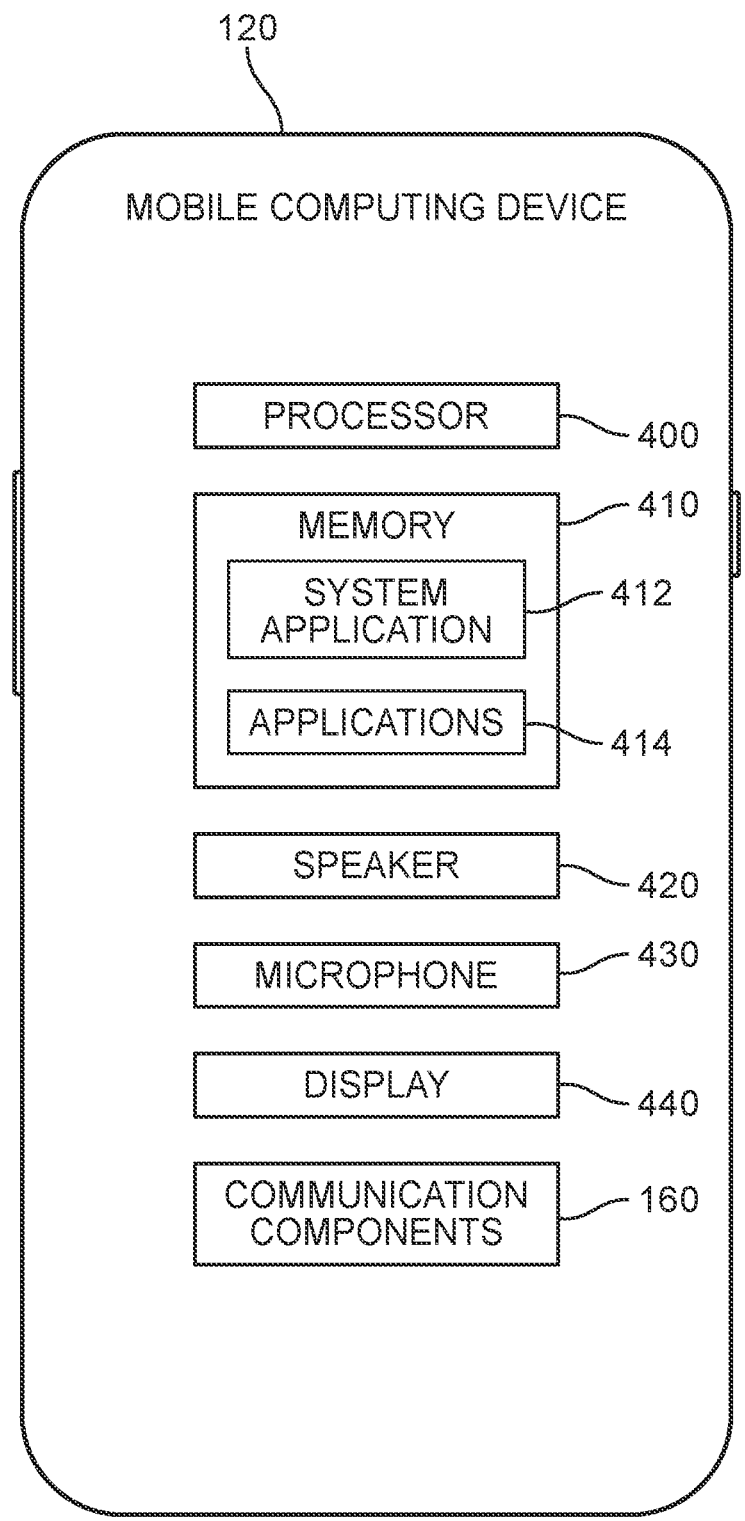
FIG. 4 is a schematic view of a mobile computing device according to an embodiment.

FIG. 4 is a schematic view of a mobile computing device according to an embodiment. FIG. 4 shows the mobile computing device 120 of FIG. 1 in greater detail. The mobile computing device 120 includes a processor 400 and a memory 410. The memory 410 stores a system application 412 which includes an operating system. The memory 410 also stores one or more applications 414. A driver may activate one or more applications to communicate with one or more providers 110 and/or a vehicle 130. In addition, the one or more applications may include an application for a digital driver's license. However, these applications are only examples of applications which can be stored in the memory 410. The memory 410 may also store other applications such as a global positioning application (GPS) application which may provide the location of the mobile computing device 120. The mobile computing device 120 also includes a speaker 420 to output audio communication to the driver. Further, the mobile computing device 120 includes a microphone 430 to receive input audio communication such as a driver's voice. The mobile computing device includes a display 440, which can display a user interface to a driver. The mobile computing device 120 also includes communication components 160 shown in FIG. 2 and discussed above.

Figure 5:
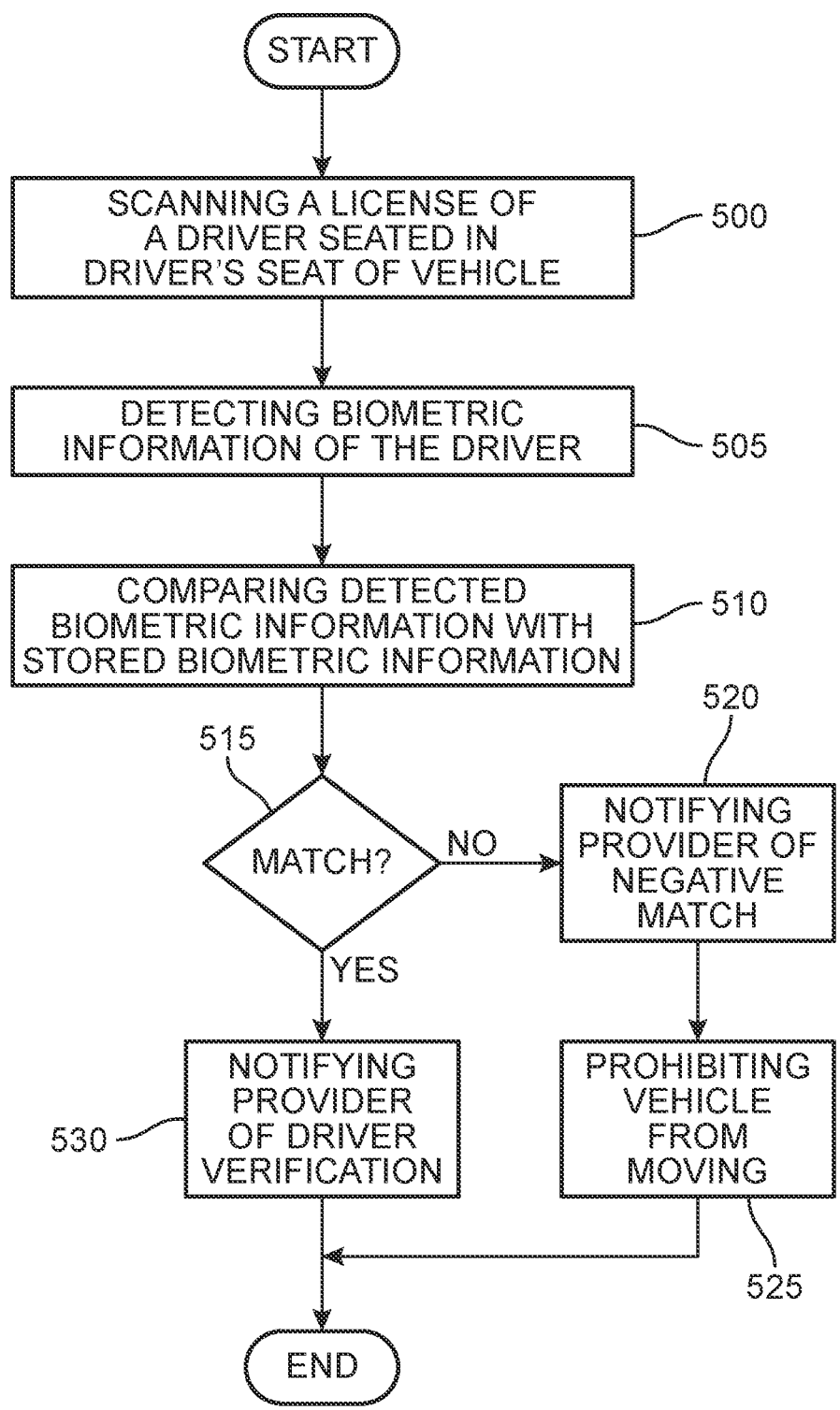
FIG. 5 is a schematic view of a process for verifying the actual driver seated in a driver's seat of a vehicle according to an embodiment.

FIG. 5 is a schematic view of a process for verifying the actual driver seated in a driver's seat 300 of a vehicle 130 according to an embodiment. In operation 500, a license of a driver seated in a driver's seat 300 of the vehicle is scanned by a license scanner 190. As discussed above, a license scanner 190 may be any device that can read or retrieve a profile of a driver (driver profile) stored on the license. For example, the license may include a chip, a bar code, a QR code, or any other mechanism, which can store a driver profile on a license of a driver. In some embodiments, the license may be placed on a license scanner 190 to retrieve the driver profile. In some embodiments, the license may be inserted into a slot of a license scanner 190 to retrieve the driver profile. In some embodiments, the license scanner 190 may be a device emitting a beam of light for scanning a driver's license to retrieve the driver profile. In some embodiments, the driver profile may include stored biometric information including one or more of a facial image, a voice, a fingerprint, a palm print, a retinal image, an iris image, and a weight of the driver.

In operation 505, the biometric information of the driver may be detected or sensed by one of sensors 180. Sensors

180 may include one or more of a camera 330, a microphone 335, a fingerprint scanner 340, a palm scanner 345, a retinal scanner 350, an iris scanner 355, and weight measuring device 360. In some embodiments, the weight measuring device 360 may be a pressure sensor in the driver's seat 300. Biometric information detected by sensors 180 may include one or more of a facial image, a voice, a fingerprint, a palm print, a retinal image, an iris image, and a weight of the driver.

In operation 510, the biometric information stored on the driver's license may be compared with the detected biometric information. If the stored biometric information does not match the detected biometric information (operation 515), then a provider 110 is notified of a negative match in operation 520. As discussed above, the provider 110 may be an insurance provider, vehicle sharing service provider, or rental vehicle service provider. In some embodiments, more than one provider may be notified of the negative match in operation 520. In some embodiments, the vehicle 130 may also be prohibited from moving in operation 525 in response to a negative match.

If the stored biometric information matches the detected biometric information (operation 515), then a provider 110 is notified of a positive match in operation 530. As discussed above, the provider 110 may be an insurance provider, vehicle sharing service provider, or rental vehicle service provider. In some embodiments, more than one provider 110 may be notified of the positive match in operation 530. As a result, one or more providers 110 have been informed that the actual driver of the vehicle 130 matches the driver's license.

In some embodiments, the driver profile of the driver may also be stored in database 116 of one or more providers 110. In some embodiments, the driver profile stored in database 116 may also include driver historical information (driver historical data) related to the use of the vehicle. In some embodiments, the notification to the one or more providers 110 allows the one or more providers 110 to update the driver historical information of the driver profile of the driver. This driver profile may provide information on the use of vehicle 130 to the one or more providers 110. For example, in some embodiments, the number of times that a driver uses vehicle 130 may be included in the driver profile. In some embodiments, a global positioning system (GPS) located in the vehicle 130 may provide additional information to the one or more providers 110. The GPS may provide information regarding the number of miles or the type of routes, which are driven by the verified driver, to further update the driver profile stored in database 116. This use of the vehicle 130 by the driver may be used by one or providers 110 to calculate insurance premiums and/or discounts to be offered to the verified driver.

Figure 6:
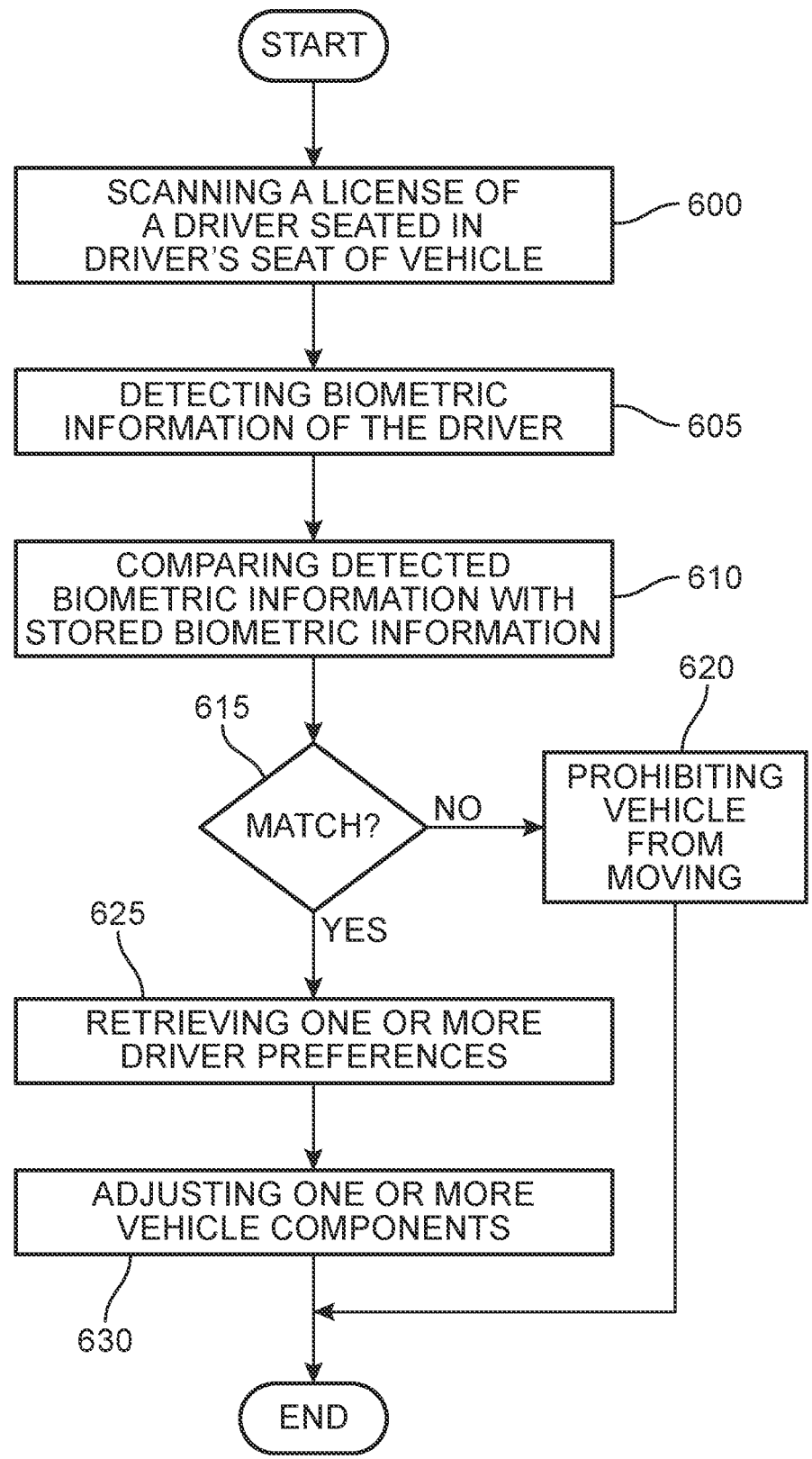
FIG. 6 is a schematic view of a process for verifying the actual driver seated in a driver's seat of a vehicle according to an embodiment.

FIG. 6 is a schematic view of a process for verifying the actual driver seated in a driver's seat 300 of a vehicle 130 according to an embodiment. In operation 600, a license of a driver seated in a driver's seat 300 of the vehicle is scanned by a license scanner 190. As discussed above, a license scanner 190 may be any device that can read or retrieve a profile of a driver (driver profile) stored on the license. For example, the license may include a chip, a bar code, a QR code, or any other mechanism, which can store a driver profile on a license of a driver. In some embodiments, the license may be placed on a license scanner 190 to retrieve the driver profile. In some embodiments, the license may be inserted into a slot of a license scanner 190 to retrieve the driver profile. In some embodiments, the license scanner 190 may be a device emitting a beam of light for scanning a driver's license to retrieve the driver profile. In some embodiments, the driver profile may include stored biometric information including one or more of a facial image, a voice, a fingerprint, a palm print, a retinal image, an iris image, and a weight of the driver.

In operation 605, the biometric information of the driver may be detected or sensed by one of sensors 180. Sensors 180 may include one or more of a camera 330, a microphone 335, a fingerprint scanner 340, a palm scanner 345, a retinal scanner 350, an iris scanner 355, and weight measuring device 360. In some embodiments, the weight measuring device 360 may be a pressure sensor in the driver's seat 300. Biometric information detected by sensors 180 may include one or more of a facial image, a voice, a fingerprint, a palm print, a retinal image, an iris image, and a weight of the driver.

In operation 610, the biometric information stored on the driver's license may be compared with the detected biometric information. In some embodiments, if the stored biometric information does not match the detected biometric information (operation 615), the vehicle 130 may be prohibited from moving in operation 620 in response to a negative match.

If the stored biometric information matches the detected biometric information (operation 615), then one or more driver preferences are retrieved in operation 625. In some embodiments, the driver preferences are retrieved from a provider 110. In some embodiments a provider 110 stores at least one of driver preferences and biometric information in a driver profile in database 116. In some embodiments, the provider may be an insurance provider, a vehicle sharing service provider, or a vehicle rental service provider. In some embodiments, the driver profile stored on the driver's license includes driver preferences in addition to the stored biometric information of the driver. In these embodiments, the driver preferences may be retrieved by scanning a license operation in operation 625. Once the driver preferences have been retrieved in operation 625, the computer system 140 instructs one or more vehicle components 170 to be adjusted (operation 630). In some embodiments, examples of vehicle components 170 include but are not limited to a driver's seat 300, lighting 305, mirror(s) 310, temperature 315, and infotainment 320. For example, the driver's seat 300 may be adjusted forward to accommodate a passenger having a shorter height. The lighting 305 in the vehicle 130 may become brighter or dimmer depending on the driver profile. For example, the driver profile may indicate that the lighting on the dashboard of vehicle 130 become brighter. One or more mirrors 310 such as the rearview mirror, driver's side mirror, and passenger side mirror may be adjusted based on driver preferences. The computing system 140 may instruct a temperature control system (temperature 315) to set the temperature in the vehicle 130. The infotainment system 320 may include a radio. After the driver has been verified, the infotainment system 320 may be adjusted to driver preferences to provide a certain type of music station such as classical or jazz music at a certain volume. The implementation of these driver preferences may improve safety, comfort and convenience.

In addition, in some embodiments, the license scanner 190 may permit the driver to update driver preferences in the driver profile after the driver of vehicle 130 has been verified. For example, in some embodiments, the driver through the license scanner 190 can instruct the computer system 140 to obtain information from the vehicle components 170. For example, the computer system 140 may obtain current information regarding seat position, lighting, mirror(s) position, temperature and infotainment from driver's seat 300, lighting 305, mirror(s) 310, temperature 315, and infotainment 320. In some embodiments, the license scanner 190 can store this information in the license having a driver profile with driver preferences. In some embodiments, the computer system 140 can utilize one or more communication components 160 to communicate with one or more providers 110 the updated driver preferences. The one or more provider providers 110 can update the driver preferences stored in the driver profile in the database (memory) 116.

Figure 7:
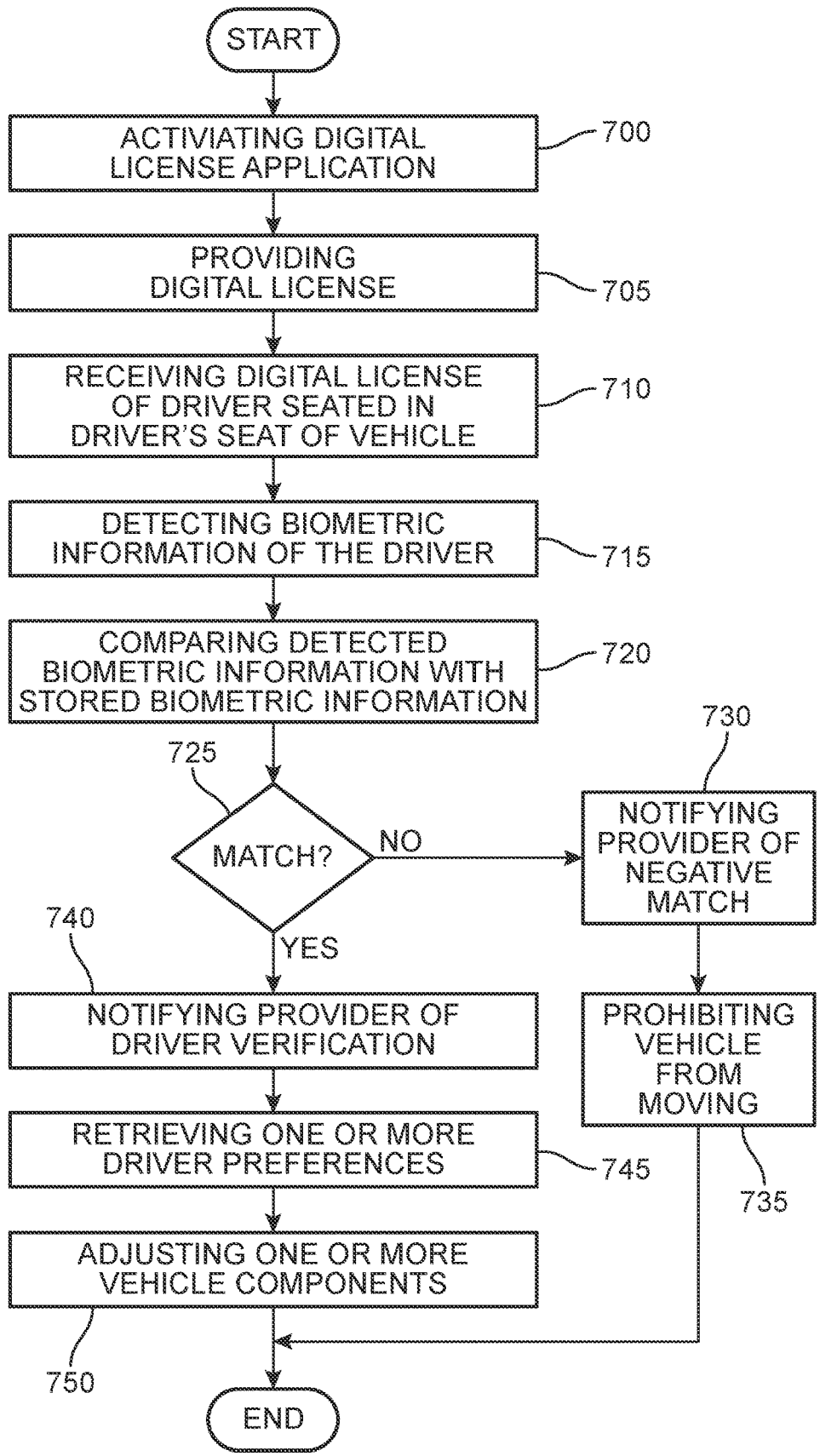
FIG. 7 is a schematic view of a process for verifying the actual driver seated in a driver's seat of a vehicle according to an embodiment.

FIG. 7 is a schematic view of a process for verifying the actual driver seated in a driver's seat 300 of a vehicle 130 according to an embodiment. In operation 700, a driver seated in a driver's seat 300 may activate a digital license application to execute the digital license application on mobile computing device shown in FIGS. 1 and 4. The digital license application may be one of the applications 414 stored in memory 410 of the mobile computing device 120. The digital license application may include a set of instructions stored in memory 410 and executed by processor 400 of the mobile computing device 120. Once the digital license application is executed, the digital license application provides a digital license (digital driver's license) in operation 705. In some embodiments, the license scanner 190 receives the digital license of the driver in the driver's seat 300 of the vehicle 130 in operation 710.

In operation 715, the biometric information of the driver may be detected or sensed by one of sensors 180. Sensors 180 may include one or more of a camera 330, a microphone 335, a fingerprint scanner 340, a palm scanner 345, a retinal scanner 350, an iris scanner 355, and weight measuring device 360. In some embodiments, the weight measuring device 360 may be a pressure sensor in the driver's seat 300. Biometric information detected by sensors 180 may include one or more of a facial image, a voice, a fingerprint, a palm print, a retinal image, an iris image, and a weight of the driver.

In operation 720, the biometric information stored on the driver's license may be compared with the detected biometric information. If the stored biometric information does not match the detected biometric information (operation 725), then a provider 110 is notified of a negative match in operation 730. As discussed above, the provider 110 may be an insurance provider, vehicle sharing service provider, or rental vehicle service provider. In some embodiments, the vehicle 130 may also be prohibited from moving in operation 735 in response to a negative match In operation 740, if the stored biometric information matches the detected biometric information (operation 725), then a provider 110 is notified of a positive match. As discussed above, the provider 110 may be an insurance provider, vehicle sharing service provider, or rental vehicle service provider. In some embodiments, more than one provider 110 may be notified of the positive match in operation 740. As a result, one or more providers 110 have been informed that the actual driver of the vehicle 130 matches the driver's license.

If the stored biometric information matches the detected biometric information (operation 725), then one or more driver preferences are also retrieved in operation 745. In some embodiments, the driver preferences are retrieved from a provider 110. In some embodiments a provider 110 stores at least one of driver preferences and biometric information in a driver profile in database 116. In some embodiments, the provider may be an insurance provider, a vehicle sharing service provider, or a vehicle rental service provider. In some embodiments, the driver profile stored on the driver's license includes driver preferences in addition to the stored biometric information of the driver. In these embodiments, the driver preferences may be retrieved by scanning a license operation in operation 745. Once the driver preferences have been retrieved in operation 745, the computer system 140 instructs one or more vehicle components 170 to be adjusted in operation 750. In some embodiments, examples of vehicle components 170 include but are not limited to a driver's seat 300, lighting 305, mirror(s) 310, temperature 315, and infotainment 320. For example, the driver's seat 300 may be adjusted forward to accommodate a passenger having a shorter height. The lighting 305 in the vehicle 130 may become brighter or dimmer depending on the driver profile. For example, the driver profile may indicate that the lighting on the dashboard of vehicle 130 become brighter. One or more mirrors 310 such as the rearview mirror, driver's side mirror, and passenger side mirror may be adjusted based on driver preferences. The computing system 140 may instruct a temperature control system (temperature 315) to set the temperature in the vehicle 130. The infotainment system 320 may include a radio. After the driver has been verified, the infotainment system 320 may be adjusted to driver preferences to provide a certain type of music station such as classical or jazz music at a certain volume. The implementation of these driver preferences may improve safety, comfort and convenience.

It may be appreciated that the above systems and methods may apply not only to vehicles moving on land, but also to vehicles moving in the air or sea. Any computing device and any network may be used to implement the above systems and methods. It is also understood that various icons can be displayed on the display of the mobile computing device or other computing devices implementing the methods and systems in embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method comprising:
   scanning a driver's license by a computer system of a vehicle;
   obtaining, by the computer system of the vehicle, a driver profile including stored biometric information from a provider computer system, wherein the driver profile is associated with information obtained by the scanning of the driver's license;
   detecting, by the computer system of the vehicle, biometric information of a person seated in a driver's seat of the vehicle using one or more sensors in the vehicle;
   comparing, by the computer system of the vehicle, the detected biometric information with the stored biometric information obtained from the provider computer system;
   determining, by the computer system of the vehicle, a result of the comparison, the result indicating that the person seated in the driver's seat of the vehicle corresponds to the driver's license;
   sending, by the computer system of the vehicle, a message to the provider computer system notifying the provider computer system of the result;
   receiving, by the computer system of the vehicle from the provider computer system, a driver preference of the person seated in the driver's seat of the vehicle; and
   adjusting, by the computer system of the vehicle, a component of the vehicle to implement the driver preference of the person seated in the driver's seat of the vehicle.

2. The method of claim 1, wherein adjusting the component of the vehicle comprises adjusting one of a position of the driver's seat, adjusting a mirror, adjusting a light, and instructing a temperature control system to set a temperature.

3. The method of claim 1, further comprising storing an insurance policy of the vehicle by the provider computer system, wherein the provider computer system is a computer system of an insurance provider.

4. The method of claim 3, further comprising:
   sending, in the message, a vehicle information to the provider computer system; and
   storing the vehicle information of the vehicle in the provider computer system when the vehicle is not owned by the driver.

5. The method of claim 1, wherein the provider computer system is a computer system of a vehicle sharing service provider.

6. The method of claim 1, wherein the provider computer system is a computer system of a rental vehicle service provider.

7. The method of claim 1, further comprising:
   obtaining current information regarding the component; and
   communicating an update of the driver preference based on the current information regarding the component.

8. The method of claim 1, wherein the one or more sensors are positioned in the vehicle and include one or more of a camera, a microphone, a fingerprint scanner, a palm scanner, a retinal scanner, an iris scanner, and a weight measuring device, wherein detecting the biometric information of the person seated in the driver's seat of the vehicle comprises at least one of capturing an image using the camera, capturing a voice using the microphone, capturing a fingerprint using the fingerprint scanner, capturing a scan of a palm using the palm scanner, performing a retinal scan using the retinal scanner, performing an iris scan using the iris scanner, and measuring a weight using the weight measuring device.

9. The method of claim 1, wherein detecting the biometric information includes capturing one or more of a facial image, a voice, a fingerprint, a palm print, a retinal image, an iris image, and a weight of the person seated in the driver's seat.

10. The method of claim 1, wherein scanning the driver's license includes receiving the driver profile from a digital license application executing on a mobile computing device.

11. A method comprising:
- scanning a driver's license, by a computer system of a vehicle;
- obtaining, by the computer system of the vehicle, a driver profile including stored biometric information from a provider computer system, wherein the driver profile is associated with information obtained by the scanning of the driver's license;
- detecting, by the computer system of the vehicle, biometric information of a person seated in a driver's seat of the vehicle using one or more sensors in the vehicle;
- comparing, by the computer system of the vehicle, the detected biometric information with the stored biometric information obtained from the provider computer system;
- determining, by the computer system of the vehicle, a result of the comparison, the result indicating that the person seated in the driver's seat of the vehicle corresponds the driver's license;
- retrieving, by the computer system of the vehicle, from the provider computer system one or more driver preferences of the person seated in the driver's seat of the vehicle and loading the one or more driver preferences into the computer system of the vehicle in response to determining the result of the comparison; and
- adjusting, by the computer system of the vehicle, a component of the vehicle to implement the driver preference of the person seated in the driver's seat of the vehicle.

12. The method of claim 11, wherein adjusting the component comprises adjusting, by the computer system of the vehicle, one or more of a position of the driver's seat, adjusting a mirror, adjusting a light, and instructing a temperature control system to set a temperature.

13. The method of claim 11, wherein the provider computer system is one of a computer system of an insurance provider, a vehicle sharing service provider, and a rental vehicle service provider.

14. The method of claim 11, wherein the one or more driver preferences include one or more of seat position, mirror position, infotainment preferences, lighting preferences, and temperature preferences.

15. The method of claim 11, wherein the one or more sensors are positioned in the vehicle and include one or more of a camera, a microphone, a fingerprint scanner, a palm scanner, a retinal scanner, an iris scanner, and weight measuring device, and wherein detecting the biometric information includes capturing one or more of a facial image, a voice, a fingerprint, a palm print, a retinal image, an iris image, and a weight of the person seated in the driver's seat.

16. The method of claim 11, wherein scanning the driver's license includes receiving the driver profile from a digital driver's license application executed executing on a mobile computing device.

17. A method for verifying a driver seated in a driver's seat of a vehicle, comprising:
- obtaining, by a computer system of a vehicle, a digital license from a digital license application, wherein the digital license indicates an individual;
- obtaining, by the computer system of a vehicle, a driver profile including driver preferences and stored biometric information from a provider computer system;
- detecting biometric information of a driver using one or more sensors in the vehicle;
- comparing the detected biometric information with the stored biometric information to verify that the driver seated in the vehicle corresponds to the individual in the digital license using a computer system of the vehicle; and
- adjusting one or more vehicle components to implement the driver preferences when the comparison verifies that the driver seated in the vehicle corresponds to in the digital license.

18. The method of claim 17, further comprising:
- retrieving, by the computer system of the vehicle, the driver preferences from the provider computer system upon verifying that the driver seated in the vehicle corresponds to in the digital license; and
- loading the driver preferences into the computer system of the vehicle, wherein adjusting the vehicle components comprises adjusting one or more of a position of the driver's seat, adjusting a mirror, adjusting a light, and instructing a temperature control system to set a temperature.

19. The method of claim 17, wherein the digital license application is executing on a mobile computing device.

* * * * *